(12) United States Patent
Rutherford et al.

(10) Patent No.: US 7,857,457 B2
(45) Date of Patent: Dec. 28, 2010

(54) FLUORESCENT VOLUME LIGHT SOURCE HAVING MULTIPLE FLUORESCENT SPECIES

(75) Inventors: Todd S. Rutherford, Cincinnati, OH (US); Dale R. Lutz, Maplewood, MN (US); Roy A. Auerbach, Cincinnati, OH (US); Ronald E. English, Jr., Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 608 days.

(21) Appl. No.: 11/862,893

(22) Filed: Sep. 27, 2007

(65) Prior Publication Data

US 2008/0079910 A1    Apr. 3, 2008

Related U.S. Application Data

(60) Provisional application No. 60/827,451, filed on Sep. 29, 2006.

(51) Int. Cl.
*F21V 7/04*    (2006.01)

(52) U.S. Cl. .......................... 353/31; 353/37; 362/552; 362/231

(58) Field of Classification Search .................. 353/31, 353/33, 34, 37; 362/84, 231, 600, 621, 622, 362/627, 629, 552
See application file for complete search history.

(56) References Cited

U.S. PATENT DOCUMENTS

| | | | |
|---|---|---|---|
| 3,317,738 A | 5/1967 | Piepenbrink et al. | |
| 3,610,729 A | 10/1971 | Rogers | |
| 3,629,136 A | 12/1971 | Melamed et al. | |
| 4,110,123 A | 8/1978 | Goetzberger et al. | |
| 4,142,781 A | 3/1979 | Baur et al. | |
| 4,147,332 A | 4/1979 | Kotaro et al. | |
| 4,149,902 A | 4/1979 | Mauer et al. | |
| 4,173,495 A | 11/1979 | Rapp et al. | |

(Continued)

FOREIGN PATENT DOCUMENTS

DE    103 21 020 A1    12/2004

(Continued)

OTHER PUBLICATIONS

U.S. Appl. No. 60/827,451, filed Sep. 29, 2006, Titled: Fluorescent Volume Light Source Having Multiple Fluorescent Species.

(Continued)

Primary Examiner—Tony Ko

(57) ABSTRACT

A projection system contains an illumination system having at least a first source of incoherent light capable of generating light in a first wavelength range. The illumination system also includes a body containing a fluorescent material that emits light in a second wavelength range, different from the first wavelength range, when illuminated by light in the first wavelength range. The system further includes at least a second fluorescent material that absorbs light in at least one of the first and second wavelength ranges, and emits light in a third wavelength range. The body has an extraction area, and at least some of the light in either the second or third wavelength ranges is internally reflected within the body to the extraction area. Light from the extraction area illuminates at least one image-forming device. Image light from the image-forming device is projected by a projection lens unit onto a screen.

20 Claims, 4 Drawing Sheets

U.S. PATENT DOCUMENTS

| | | | |
|---|---|---|---|
| 4,292,959 A | 10/1981 | Coburn, Jr. | |
| 4,298,802 A | 11/1981 | Quella et al. | |
| 4,425,907 A | 1/1984 | Younghouse | |
| 4,446,305 A | 5/1984 | Rogers et al. | |
| 4,488,047 A | 12/1984 | Thomas | |
| 4,488,074 A | 12/1984 | Marandet | |
| 4,540,623 A | 9/1985 | Im et al. | |
| 5,406,578 A | 4/1995 | Gross et al. | |
| 5,448,404 A | 9/1995 | Schrenk et al. | |
| 5,580,932 A | 12/1996 | Koike | |
| 5,793,456 A | 8/1998 | Broer et al. | |
| 5,816,238 A | 10/1998 | Burns et al. | |
| 5,841,579 A | 11/1998 | Bloom et al. | |
| 5,882,774 A | 3/1999 | Jonza et al. | |
| 5,903,091 A | 5/1999 | MacLennan et al. | |
| 5,949,933 A | 9/1999 | Steiner et al. | |
| 5,974,059 A | 10/1999 | Dawson | |
| 6,122,103 A | 9/2000 | Perkins et al. | |
| 6,134,258 A | 10/2000 | Tulloch et al. | |
| 6,172,668 B1 | 1/2001 | Baur | |
| 6,229,939 B1 | 5/2001 | Komine | |
| 6,272,269 B1 | 8/2001 | Naum | |
| 6,332,688 B1 | 12/2001 | Magarill | |
| 6,351,069 B1 | 2/2002 | Lowery et al. | |
| 6,418,252 B1 | 7/2002 | Maitland | |
| 6,504,301 B1 | 1/2003 | Lowery | |
| 6,509,651 B1 | 1/2003 | Matsubara et al. | |
| 6,517,213 B1 | 2/2003 | Fujita et al. | |
| 6,580,097 B1 | 6/2003 | Soules et al. | |
| 6,614,179 B1 | 9/2003 | Shumizu et al. | |
| 6,685,341 B2 | 2/2004 | Ouderkirk et al. | |
| 6,687,436 B2 | 2/2004 | Griffin | |
| 6,744,960 B2 | 6/2004 | Pelka | |
| 6,759,145 B2 | 7/2004 | Lin et al. | |
| 6,769,773 B1 | 8/2004 | Wu | |
| 6,771,325 B1 | 8/2004 | Dewald et al. | |
| 6,784,603 B2 | 8/2004 | Pelka et al. | |
| 6,806,648 B2 | 10/2004 | Shimizu et al. | |
| 6,831,934 B2 | 12/2004 | Wang et al. | |
| 6,869,206 B2 | 3/2005 | Zimmerman et al. | |
| 6,879,609 B2 | 4/2005 | Schardt et al. | |
| 6,898,020 B2 | 5/2005 | Ouchi | |
| 6,917,399 B2 | 7/2005 | Pokorney et al. | |
| 6,960,872 B2 | 11/2005 | Beeson et al. | |
| 6,976,779 B2 | 12/2005 | Ohtsuki et al. | |
| 6,991,358 B2 | 1/2006 | Kokogawa et al. | |
| 6,995,355 B2 | 2/2006 | Rains et al. | |
| 7,011,421 B2 | 3/2006 | Hulse et al. | |
| 7,030,419 B2 | 4/2006 | Shin et al. | |
| 7,040,774 B2 | 5/2006 | Beeson et al. | |
| 7,108,416 B1 | 9/2006 | Ossawa | |
| 7,147,332 B2 | 12/2006 | Connor | |
| 7,293,907 B2 | 11/2007 | Kim et al. | |
| 7,316,497 B2 * | 1/2008 | Rutherford et al. | 362/600 |
| 7,467,885 B2 | 12/2008 | Grötsch et al. | |
| 2005/0074216 A1 | 4/2005 | Irie | |
| 2005/0135761 A1 | 6/2005 | Cannon et al. | |
| 2005/0146652 A1 | 7/2005 | Yokoyama et al. | |
| 2005/0147372 A1 | 7/2005 | Bourdelais et al. | |
| 2005/0174658 A1 | 8/2005 | Long et al. | |
| 2006/0002131 A1 * | 1/2006 | Schultz et al. | 362/551 |
| 2006/0028620 A1 | 2/2006 | Conner | |
| 2006/0227570 A1 | 10/2006 | Rutherford et al. | |
| 2007/0279501 A1 | 12/2007 | Goto et al. | |
| 2007/0280622 A1 | 12/2007 | Rutherford | |

FOREIGN PATENT DOCUMENTS

| | | |
|---|---|---|
| EP | 1130451 A1 | 9/2001 |
| EP | 1253787 A2 | 10/2002 |
| JP | 03 266584 | 11/1991 |
| JP | 03 295319 | 10/2003 |
| WO | WO 01/27962 | 4/2001 |

OTHER PUBLICATIONS

U.S. Appl. No. 60/803,816, filed Jun. 2, 2006, Titled: Fluorescent Volume Light Source with Reflector.

U.S. Appl. No. 11/421,787, filed Jun. 2, 2006, Titled: Fluorescent Light Source Having Light Recycling Means.

U.S. Appl. No. 60/803,821, filed Jun. 2, 2006, Titled Fluorescent Volume Light Source with Air Gap Cooling.

W.A. Shurcliff, "Radiance amplification by multi-stage fluorescence system," J. Opt. Soc. Am., 41, 289, 1951.

G. Keil, "Radiance amplification by a fluroscence radiation converter," J. Appl. Phys., 40, 3544-3547, 1969.

Reinberg, A.R., et al., "GaAs: Si LED Pumped Yb-Doped YAG Laser," *Applied Physics Letters*, vol. 19, No. 1, pp. 11-13 (Jul. 1, 1971).

Garwin, "The Collection of Light from Scintillation Counters" *Rev. Sci. Instruments*, vol. 31, pp. 1010-0111 (1960).

Goetzberger, et al., "Solar Energy Conversion with Fluorescent Collectors" *Appl. Phys.* vol. 14, pp. 123-139 (1977).

Weber, et al., "Luminescent Greenhouse Collector for Solar Radiation", *Applied Optics*, vol. 15, No. 11, pp. 2299-2300 (1976).

Levitt et al., "Materials for Luminescent Greenhouse Colar Collectors" *Applied Optics*, vol. 16, No. 10, pp. 2684-2689 (1977).

Goldberg, L. et al., "High Efficiency 3 W Side-Pumped Yb Fiber Amplifier and Laser," *Conference: Technical Digest, Summaries of Papers Presented at the Conferences on Lasers and Electro-Optics, Postconference Edition, CLEO '99, Conference on Lasers and Electro-Optics* (IEEE Cat. No. 99CH37013), pp. 11-12.

Jacobs et al., "Measurement of Excited-State-Absorption Loss for $Ce^{3+}$ in $Y_3Al_5O_{12}$ and Implications for Tunable 5d→4f rare-earth lasers[3])", Applied Physics Letters, vol. 33, (1978) p. 410.

Mauer et al., "Fluorescent Concentrator for Solar Energy Collection", *Research Disclosure*, vol. 129, p. 20, 1975.

Hideur, A., et al., "High-Power Double-Clad Yb-Doped Fiber Laser," SPIE, vol. 4751, (2002), pp. 510-520.

Rutherford, T.S., et al., "Yb:YAG and Nd:YAG Edge-Pumped Slab Lasers," *Optics Letters*, vol. 26, No. 13 (Jul. 1, 2001), pp. 986-988.

Steigerwald, D.A. et al., "Illumination with Solid State Lighting Technology", *IEEE Journal of Selected Topics in Quantum Electronics*, vol. 8, No. 2 (Mar.-Apr. 2002), pp. 310-320.

Shurcliff, "Radiance Amplification by Multi-Stage Fluorescence System" *J. Opt. Soc. Am.* vol. 41, No. 3, p. 209 (1951).

Keil, "Radiance Amplification by a Fluorescence Radiation Converter", *J. Appl. Phys.* vol. 40, No. 9, pp. 3544-3547 (1969).

* cited by examiner ved. At least some of the light at either the second or third wavelength is directed by the body towards the light extraction area. The combined light of the second and third wavelengths passing through the light extraction area has a higher brightness than the brightness of the first wavelength light passing in through the at least one pump area.

FLUORESCENT VOLUME LIGHT SOURCE HAVING MULTIPLE FLUORESCENT SPECIES

RELATED APPLICATIONS

The present application claims priority to U.S. Provisional Application No. 60/827,451, "Fluorescent Volume Light Source Having Multiple Fluorescent Species", filed Sep. 29, 2006, the disclosure of which is hereby incorporated by reference.

The present application is related to the following co-owned and co pending U.S. patent applications: Ser. No. 11/092,284, "Fluorescent Volume Light Source", filed Mar. 29, 2005; Ser. No. 60/803,816, "Fluorescent Volume Light Source with Reflector", filed Jun. 2, 2006; Ser. No. 11/421,787, "Fluorescent Light Source Having Light Recycling Means", filed Jun. 2, 2006; and Ser. No. 60/803,821, "Fluorescent Volume Light Source with Air Gap Cooling", filed Jun. 2, 2006, all of which are hereby incorporated by reference to the extent that they are not inconsistent with the present disclosure.

FIELD

The disclosure relates to light sources, and particularly to light sources that might be used in illumination systems, for example projection systems.

BACKGROUND

The brightness of illumination sources based on any one type of light source is typically limited by the brightness of the light source itself. For example, an illumination source that uses light emitting diodes (LEDs) typically has a brightness, measured in power per unit area per unit solid angle, the same as or less than that of the LEDs because the optics that collect the light from the source LEDs will, at best, conserve the étendue of the LED source. Accordingly, the brightness of the illumination source is limited.

In some applications of illumination sources, such as projector illumination, illumination by LEDs is not a competitive option because the brightness of the LEDs that are currently available is too low. This is particularly a problem for the generation of green illumination light, a region of the visible spectrum where the semiconductor materials used in LEDs are less efficient at generating light.

Other types of light sources may be able to produce a sufficiently bright beam of light but they also suffer from other drawbacks. For example, a high-pressure mercury lamp is typically able to provide sufficient light for a projection system, but this type of lamp is relatively inefficient, requires a high voltage supply and has limited lifetime. Solid-state sources, such as LEDs, are more efficient, operate at lower voltages, and are therefore safer, and have longer lifetimes than lamps, often extending to several tens of thousands of hours.

Therefore, there exists a need for a solid-state light source that can be used in illumination systems that is brighter than current light sources.

SUMMARY

An embodiment is directed to a projection system that includes an illumination system, a projection unit having at least one image-forming device, a projection lens unit, and a screen. The illumination system includes at least a first source of incoherent light capable of generating light in a first wavelength range. The illumination system also includes a body containing a first fluorescent material that emits light in a second wavelength range, different from the first wavelength range, when illuminated by light in the first wavelength range. Furthermore, the illumination system includes at least a second fluorescent material receiving at least some of the light of at least one of the first and the second wavelength ranges, this second fluorescent material generating light of a third wavelength range. Also, the body has an extraction area. At least some of the light of at least one of the second wavelength and the third wavelength is internally reflected within the body to the extraction area. In this projection system, light in at least one of the second wavelength range and the third wavelength range illuminates the at least one image-forming device, and image light from the at least one image forming device is projected by the projection lens unit to the screen.

An embodiment is directed to an illumination system that includes a body containing fluorescent material. The body has at least one pump area and a light extraction area. At least one light emitting diode (LED) is capable of generating light at a first wavelength. At least some of the light at the first wavelength passes through the at least one pump area into the body. Fluorescent light at a second wavelength is generated in the body by the light at the first wavelength. A second fluorescent material in the system receives light of the first or second wavelength, or both, and generates light of a third wavelength. At least some of the light at either the second or third wavelength is directed by the body towards the light extraction area. The combined light of the second and third wavelengths passing through the light extraction area has a higher brightness than the brightness of the first wavelength light passing in through the at least one pump area.

An embodiment is directed to an illumination system that includes at least a first solid state source of incoherent light capable of generating light in a first wavelength range and a body containing a first fluorescent material that emits light in a second wavelength range, different from the first wavelength range, when illuminated by light in the first wavelength range. The illumination system also includes at least a second fluorescent material that emits light in a third wavelength range when illuminated by light in at least one of the first and second wavelength ranges. The body has an extraction area, and at least some of the light in at least one of the second or third wavelength ranges is internally reflected within the body to the extraction area.

Yet another embodiment is directed to a method of generating a bright light of a desired color or spectrum. The method involves providing at least a first source of incoherent light that can generate light in a first wavelength range. The method also involves providing a body containing a first fluorescent material that emits light in a second wavelength range, different from the first wavelength range, when illuminated by light in the first wavelength range. The method further involves providing at least a second fluorescent material that emits light in a third wavelength range when illuminated by light in at least one of the first and second wavelength ranges. Also, the body has an extraction area, such that at least some of any light of at least one of the second and third wavelengths emitted within the body would be internally reflected within the body to the extraction area. A bright light of a desired color is produced by illuminating the body with the incoherent light from the first source.

The above summary of the present disclosure is not intended to describe each illustrated embodiment or every implementation of the disclosure. The following figures and the detailed description more particularly exemplify these embodiments.

BRIEF DESCRIPTION OF THE DRAWINGS

This disclosure may be more completely understood in consideration of the following detailed description of various embodiments in connection with the accompanying drawings, in which.

Figure 1A:
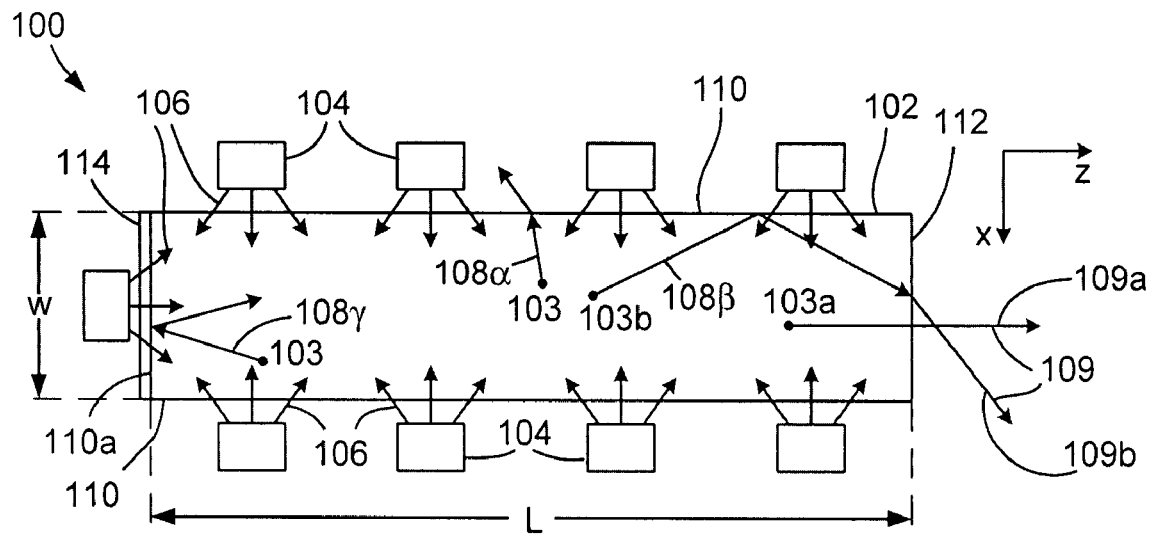
FIGS. 1A and 1B schematically illustrate an embodiment of a volume fluorescent light unit.

Like numerals in different figures refer to similar elements. While the disclosure is amenable to various modifications and alternative forms, specifics thereof have been shown by way of example in the drawings and will be described in detail. It should be understood, however, that the intention is not to limit this disclosure to the particular embodiments described. On the contrary, the intention is to cover all modifications, equivalents, and alternatives falling within the spirit and scope as defined by the appended claims.

DETAILED DESCRIPTION

The present disclosure is applicable to light sources and is more particularly applicable to light sources that are used in illumination systems where a high level of brightness is required.

The brightness of a light source is measured in optical power (Watts) divided by the étendue. The étendue is the product of the area of the light beam at the light source times the square of the refractive index times the solid angle of the light beam. The étendue of the light is invariant, i.e. if the solid angle of the light beam is reduced without loss of the light, then the area of the beam must be increased, e.g. by increasing the emitting area of the light source. Since the étendue is invariant, the brightness of the light generated by the light source can only be increased by increasing the amount of light extracted from the light source. If the light source is operating at maximum output, then the brightness of that light source can no longer be increased.

The brightness of the light beam may be increased through the use of additional light sources. There are limits, however, as to how much the brightness of the light beam can be increased by simply adding more light sources. The optical system that directs the light beam to the target accepts light that is within certain aperture and cone angle limits only. These limits depend on various factors, such as the size of the lenses and the f-number of the optical system. The addition of more light sources does not provide an unlimited increase in the brightness of the light beam because, at higher numbers of light sources, an increasingly smaller fraction of the light from an added light source lies within the aperture and cone angle limits of the optical system.

The present disclosure is believed to be useful for producing a concentrated incoherent light source, having a relatively high brightness, using a number of light sources that have a relatively lower brightness, such as light emitting diodes. The light from the lower brightness light sources is used to optically pump a volume of fluorescent material. The fluorescent material absorbs the light emitted by the low brightness light source and fluorescently emits light at a different wavelength. The fluorescent light is typically emitted isotropically by the fluorescent material. At least some of the fluorescent light can be directed within the volume to a light extraction area. The pump surface area is the area of the fluorescent volume that is used for coupling the relatively low brightness, short wavelength pump light into the volume, and the extraction area is that area of the fluorescent volume from which fluorescent light is extracted. A net increase in brightness can be achieved when the pump surface area is sufficiently large compared to the extraction area.

In some applications such as projection, where a full color image is generated by combining imaged light from three or more separate light sources, such as a red, a green and a blue light source, the light from each source can generally fall entirely within a specified wavelength band, in order to achieve a satisfactory color purity and color gamut. Similarly, it may be desirable for the light from each source to have a relatively broad and uniform spectrum within the specified wavelength band, for reasons of image brightness and energy efficiency. In illumination systems based on a single fluorescent material in a fluorescent volume, the emission spectrum of the fluorescing species may not have its peak emission wavelength at the desired wavelength, the emission spectrum may be undesirably narrow or irregular, or the emission spectrum may include wavelengths outside the specified wavelength band, which must then be filtered out. The filtered wavelengths represent wasted energy and inefficiency in the illumination system. In certain other projection applications, or in applications such as general illumination, endoscopes/boroscopes, vehicle headlights, etc., it may be desirable to have an illumination source with a "white light" emission spectrum that spans most of the visible spectrum. For these reasons, it may be desirable to use illumination sources base on combinations or two or more fluorescent materials, in order to more effectively tailor the output spectrum of the illumination source to the desired spectral shape and wavelength band.

In the following description, the term fluorescence covers phenomena where a material absorbs light at a first wavelength and subsequently emits light at a second wavelength that is different from the first wavelength. The emitted light may be associated with a quantum mechanically allowed transition, or a quantum mechanically disallowed transition, the latter commonly being referred to as phosphorescence. If the fluorescent material absorbs only a single pump photon before emitting the fluorescent light, the fluorescent light typically has a longer wavelength than the pump light. In some fluorescent systems, however, more than one pump photon may be absorbed before the fluorescent light is emitted, in which case the emitted light may have a wavelength shorter than the pump light. Such a phenomenon is commonly referred to as upconversion fluorescence. In some other fluorescent systems, light is absorbed by an absorbing species in the fluorescent material and the resulting energy transferred to a second species in the material nonradiatively, and the second species emits light. As used herein, the terms fluorescence and fluorescent light are intended to cover systems where the pump light energy is absorbed by one species and the energy is re-radiated by the same or by another species.

Figure 1B:
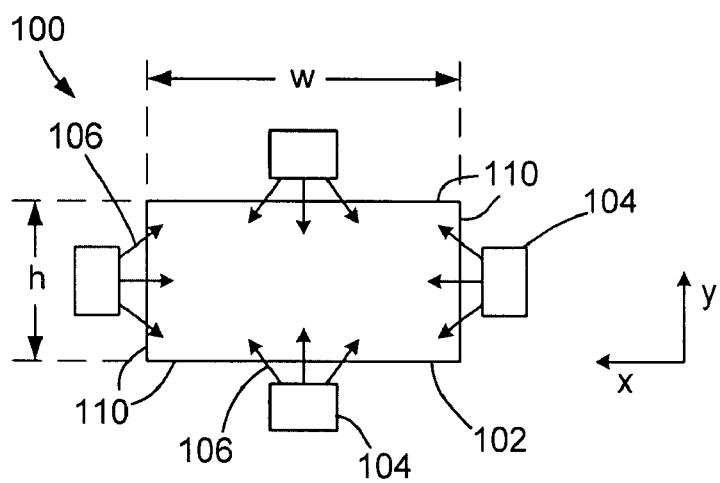

One particular embodiment of the disclosure is schematically illustrated in FIGS. 1A and 1B which show orthogonal views of a volume fluorescent light unit 100 that has a body 102 containing at least two fluorescent materials 103*a* and 103*b*, and a number of light emitters 104 that emit light 106 into the body 102. The light emitters 104 may, for example, be a linear array of LEDs along at least one side of body 102, similar to those shown in FIGS. 1A and 1B. Fluorescent materials or species 103*a* and 103*b* may be collectively referred to as 103.

The body 102 may be formed of any suitable material. For example, the body 102 may be formed of a fluorescent material itself, or may be formed of some dielectric material that is transparent to the fluorescent light and that contains the fluorescent materials. Some suitable examples of dielectric material include but are not limited to, inorganic crystals, glasses and polymer materials. Some examples of fluorescent materials that may be doped into the dielectric material include but are not limited to, rare-earth ions, transition metal ions, organic dye molecules and phosphors. One suitable class of dielectric and fluorescent materials includes inorganic crystals doped with rare-earth ions, such as cerium-doped yttrium aluminum garnet (Ce:YAG) co-doped with at least a second rare-earth ion, such as Europium (Eu) or Terbium (Tb), or doped with transition metal ions, such as chromium- and titanium-co-doped sapphire. Rare-earth and transition metal ions may also be doped into glasses.

Another suitable class of material includes a fluorescent dye doped into a polymer body. Many types of fluorescent dyes are available, for example from Sigma-Aldrich, St. Louis, Mo., and from Exciton Inc., Dayton, Ohio. Common types of fluorescent dyes include but are not limited to, fluorescein; rhodamines, such as Rhodamine 6G and Rhodamine B; and coumarins such as Coumarin 343 and Coumarin 6. The particular choice of dye depends at least in part on the desired wavelength range of the fluorescent light and the wavelength of the pump light. Many types of polymers are suitable as hosts for fluorescent dyes including, but not limited to, polymethylmethacrylate and polyvinylalcohol. One specific example of such a co-doped system is a mixture of 0.02 wt % Coumarin 6 and 0.03 wt % Nile Red in a polystyrene matrix.

Phosphors include particles of crystalline or ceramic material that include a fluorescent species. A phosphor is often included in a matrix, such as a polymer matrix. In some embodiments, the refractive index of the matrix may be substantially matched, within at least 0.02, to that of the phosphor so as to reduce scattering. In other embodiments, the phosphor may be provided as nanoparticles within the matrix (there is little scattering of light within the resulting matrix due to the small size of the particles, even if the refractive indices are not well matched). Examples of useful phosphors include but are not limited to, Europium-doped strontium thiogallate ($SrGa_2S_4:Eu^{2+}$), Europium-doped Yttrium oxide ($Y_2O_3:Eu$), mixed rare earth phosphates such as (LaCeTb)$PO_4$, rare earth doped aluminum oxides such as (Ce,Tb)$MgAl_{11}O_9$, etc.

Other types of fluorescent materials include doped semiconductor materials, for example doped II-VI semiconductor materials such as zinc selenide and zinc sulphide.

One example of an upconversion fluorescent material is a thulium-doped silicate glass, described in greater detail in co-owned U.S. Pat. No. 6,879,609, incorporated by reference herein in its entirety. In this material, two, three or even four pump light photons are absorbed in a thulium ion ($Tm^{3+}$) to excite the ion to different excited states that subsequently fluoresce.

The particular selection of fluorescent material depends at least in part on the desired fluorescent wavelength and the wavelength of the light emitted from the light source 104. In one embodiment, the fluorescent material absorbs the pump light 106 emitted by the light source efficiently, so that the pump light 106 is mostly, if not all, absorbed within the body 102. This enhances the efficiency of converting pump light 106 to useful fluorescent output light 109. The particular examples of fluorescent species described above are presented for illustrative purposes only, and are not intended to be limiting.

The fluorescent species 103*a* and 103*b* do not need to be uniformly distributed within the fluorescent body. For example, species 103*a* could have a higher relative concentration at one end of the fluorescent body.

The embodiment shown in FIGS. 1A and 1B will be discussed here in the simple case in which each of the fluorescent species 103*a* and 103*b* independently absorb the same pump light 106 and emit fluorescent light 108 without interacting with each other. However, the multiple fluorescent species can interact optically in several different ways, including (for exemplary purposes only) the following examples. The first example independent with the same pump light: multiple species each absorb some pump light, then emit at different fluorescent wavelengths. The second example is independent with different pump lights: each fluorescent species absorbs pump light from a different wavelength range, and emits at a fluorescent wavelength. The third example is a cascade: a first fluorescent species absorbs some pump light, and emits at a longer wavelength. The next fluorescent species absorbs that emitted light, and re-emits light at a still longer wavelength. The process could continue for a third fluorescent species, a fourth, etc. A fourth example is non-radiative: a first fluorescent species absorbs pump light. Some of the energy absorbed by the first species is transferred by a non-radiative mechanism to a second fluorescent species, which emits some of the energy as fluorescence. The first species may also directly emit a fraction of the absorbed energy as fluorescence.

More specific examples of possible interactions of the fluorescent species are described further below. One example includes, a first and second fluorescent species that each absorb some light of a first wavelength, the first fluorescent species emits light of a second wavelength longer than the first, and the second fluorescent species emits light of a third wavelength longer than the second.

A second example includes a first fluorescent species that absorbs some light at a first wavelength, emits at a second longer wavelength, a second fluorescent species that absorbs some of the light of the second wavelength, and emits light of a third wavelength that is longer than the second. This can be especially useful when the absorption of the second wavelength by the second fluorescent species is weak. Because much of the light of the second wavelength is trapped within the optical body, this light has a long path length to be absorbed by the second fluorescent species.

A third example includes a first fluorescent species that absorbs some light at a first wavelength, and emits a fraction of that energy as light of a second, longer wavelength. Some of the energy absorbed by the first species is transferred by a non-radiative mechanism to a second fluorescent species, which emits some of the energy as light of a third wavelength.

A fourth example includes a first fluorescent species that absorbs some light at a first wavelength. Some of the energy absorbed by the first species is transferred by a non-radiative mechanism to a second fluorescent species, which emits some of the energy as light of a second wavelength, longer than the first.

A fifth example includes a first fluorescent species that absorbs some light of a first wavelength, and a second fluorescent species that absorbs some light of a second wavelength. The first fluorescent species emits light at a third wavelength that is longer than the first. The second fluorescent species emits light at a fourth wavelength that is longer than the second. The third and fourth wavelength ranges could be the same or could partially overlap.

All of the above can be generalized to include a third, fourth, etc. fluorescent species. Appropriate combinations of source wavelengths and fluorescent species can produce a bright, essentially white light source, which can be useful in some projection and general illumination applications. Including phosphor layers in such systems may be particularly useful for constructing a white light source, due to the greater flexibility in choosing emitting materials having the desired spectra.

It is known that the absorption and emission spectra and quantum efficiencies of fluorescent bodies vary with the concentration of the fluorescent species or other light-absorbing species, particularly for systems containing two or more light-absorbing species, due to effects such as self-absorption, concentration quenching, defect concentration changes, nearest neighbor interactions, etc.

In one embodiment, the fluorescent material could be capable of efficient excitation at a wavelength where efficient LEDs or other such light sources are available. The material can also have a relatively strong absorption, so that the pump light is efficiently absorbed in a short distance in the shorter (cross-sectional) dimension of the fluorescent body. Also, any fluorescence at wavelengths outside the desired range for a particular application may be wasted in systems using a single fluorescent material, causing inefficiency. The use of multiple fluorescent species can address these problems.

The light emitters 104 may be any suitable type of device that emits incoherent light. The present disclosure is believed to be particularly useful for producing a relatively bright beam using light from less bright light emitters.

In some exemplary embodiments, the light 106 emitted from the light emitters 104 is in a wavelength range that overlaps with an absorption spectrum of at least one of the fluorescent materials. Also, it can be useful if the light emitters 104 can be oriented so that there is a high degree of optical coupling of the emitted light 106 into the body 102. One suitable type of light emitter is the LED, which typically generates light 106 having a bandwidth in the range of about 20 nm to about 50 nm, although the light bandwidth may be outside this range. In addition, the radiation pattern from an LED is, in many cases, approximately Lambertian, so relatively efficient coupling of the light 106 into the body 102 is possible. Other types of light emitters may also be used, including but not limited to, a gas discharge lamp, a filament lamp and the like. Reflectors, or other optical elements such as refracting or diffracting elements, may be used to direct pump light to the body 102 that would otherwise not be directed to the body 102.

In this particular embodiment, the pump light enters the body 102 through pump surfaces 110 and the fluorescent output light 109 of at least one of the fluorescent materials passes out of the body 102 through an extraction face 112.

The fluorescent materials 103 in the body 102 emit fluorescent light 108. Some portions of the fluorescent light, exemplified by ray 108α, may be transmitted through a pump surface 110 of the body 102. Other portions of the fluorescent light, exemplified by ray 108β, may be reflected within the body 102. For example, when the light 108β is incident at a pump surface 110 at an angle, measured relative to the normal to the pump surface 110, that is greater than the critical angle, the light 108 β is totally internally reflected within the body 102.

The rear surface 110a may be provided with a reflective coating 114 that reflects fluorescent light, exemplified by ray 108γ, incident thereon at an angle less than the critical angle. The reflective coating 114 may be any suitable type of coating that reflects fluorescent light incident at the rear surface 110a. For example, the reflective coating 114 may be a multilayer, inorganic dielectric coating or an adhered polymer multilayer optical film (MOF), or a metal coating. If the reflective coating 114 is a multilayer, inorganic dielectric coating or a MOF, then it may be possible to design the reflective coating 114 to pass pump light 106 and reflect fluorescent light 108γ, thus allowing the body 102 to be pumped through the rear surface 110a. Metal coatings typically have a broad reflectivity spectrum that mitigates against pumping through the rear surface 110a. Where the reflective coating 114 is transparent to the pump light, it may be possible to pump the body 102 through the rear surface 110a.

Some of the fluorescent light that passes out of the body 102 through the extraction face 112, exemplified by light ray 109a, may pass directly out of the body 102 without reflection at any surface of the body 102. Other portions of the output fluorescent light 109, exemplified by light ray 109b, may have been reflected within the body 102.

A Cartesian co-ordinate system is provided in FIGS. 1A and 1B to aid in the description of the volume fluorescent light unit 100. The directions of the co-ordinate system have been arbitrarily assigned so that the output fluorescent light propagates generally along the z-direction, which is parallel to the long side of the body 102, having a length, L. The width of the body 102, w, is measured in the x-direction and the height of the body 102, h, is measured in the y-direction.

The body 102 may take on different shapes. In the illustrated exemplary embodiment, the body 102 has a rectangular cross-section, parallel to the x-y plane. In other exemplary embodiments, the cross-section of the body 102 may be different, including but not limited to, circular, triangular, elliptical, or polygonal. The cross-section of the body 102 may also be irregularly shaped.

An estimate of the brightness enhancement provided by the volume fluorescent light unit 100 may be obtained as follows. If it is assumed that the pump light 106 enters only the four major surfaces of the body 102, i.e. those surfaces defined by the length of the body, and the rear surface 110a remains unpumped, then the total pumped area is equal to 2L(w+h). The étendue, Ein, available for coupling the pump light 106 into the body is given, therefore, by:

$$E{in}=2L(w+h)\pi=2\pi L(w+h). \quad (1)$$

The critical angle, θc, for total internal reflection within the body 102 is given by θc=sin−1 (1/n), where n is the refractive index of the body 102. If the body has a refractive index of 1.5, then θc=41.8°. Therefore, only fluorescent light within a cone of 2π(1−cos(41.8°)) steradians is coupled out of the extraction face 112. The cone contains a fraction F=(1−cos(41.8°)) =0.255 of the total light emitted in the volume. If there is a reflector at the rear surface 110a, then 25.5% of the light should escape through a single end. Tilting the rear surface 110a, as described in U.S. Patent Publication No. 2006/0227570, may increase the fraction of light coupled out of the extraction face 112 to 30%. Creating an optical coupling to the end of the slab can also increase the fraction of light that is extracted.

In the illustrated embodiment, the fluorescent light 109 emitted through the extraction face 112 is directed over all angles in the +z direction. Thus, the étendue, Eout, of the fluorescent output light 109 from the extraction face 112 is given by:

$$Eout = \pi wh, \qquad (2)$$

so the étendue is increased by a factor, M, of $$M = Ein/Eout = 2(L/w)(1+w/h) \qquad (3)$$

The overall brightness at the fluorescent output is reduced by the optical power lost, η, that includes the following components: i.) Fresnel transmission of pump light 106 into body; ii.) Absorption efficiency of the pump light in the body; iii.) Stokes efficiency of fluorescence; iv.) Quantum efficiency of fluorescence; v.) Extraction of fluorescent light from body; and vi.) Physical losses of the fluorescent light (i.e. scatter and absorption). The value of η may be obtained by multiplying these factors together.

Therefore, the brightness of the output fluorescent light is enhanced over that of the input pump light 106 by a factor of:

$$M = 2\eta(L/w)(1+w/h) \qquad (4)$$

In an example where L=20w and w/h=16/9 and η=0.2, the brightness is increased, therefore, by a factor of 22.2. As is discussed below, various modifications to this basic embodiment of volume fluorescent light unit 100 may be made to increase the brightness enhancement.

In an embodiment, it may be desirous that only a small amount of fluorescent light within the body be scattered, in order to preserve the étendue enhancing properties of the volume fluorescent light unit. Therefore, in one embodiment the mean free path for fluorescent light in the body itself, i.e. the average distance between bulk scattering events, can be about 2L, or longer. Also, to reduce scattering loss when the light is internally reflected, the scatter per total internal reflection can be less than about 5%/(2L/h).

Figure 2:
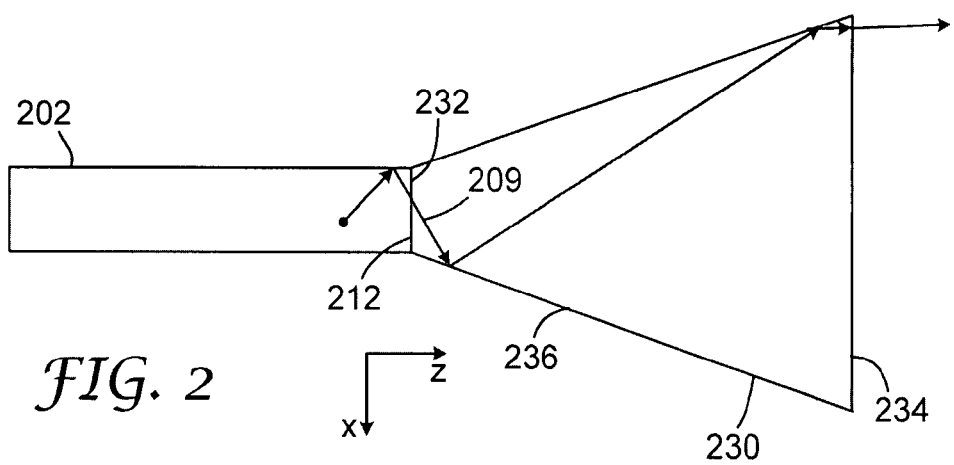
FIG. 2 schematically illustrates an embodiment of a fluorescent body with a light output extractor.

To improve the utilization efficiency for the pump light and the fluorescent light that is not captured within the body by total internal reflection (TIR), wavelength-selective, specular, or diffuse reflectors may be placed adjacent to and spaced apart from the pump surface 110, as shown in FIGS. 2A and 2B of U.S. Patent Publication No. 2006/0227570 and the associated text, which is hereby incorporated by reference.

The extraction surface 112 may be provided with an anti-reflection coating to reduce reflective losses to fluorescent light transmitted through the extraction surface 112. This does not, however, prevent the possibility that the fluorescent light is incident at the extraction surface at a sufficiently high angle to be totally internally reflected.

A light output extractor may be provided at the extraction face to reduce the amount of fluorescent light that is totally internally reflected at the extraction face. Different types of output extractors may be used. In one such approach, schematically illustrated in FIG. 2A, a tapered, transmissive solid is coupled to the extraction face 212 of the fluorescent body 202 for use as an output extractor 230. The extractor 230 has a rear surface 232 shaped to closely couple to the extraction face 212 of the body 202. In an embodiment, both the rear surface 232 and the extraction face 212 are flat. If the rear surface 232 and the extraction face 212 are sufficiently matched, then light can be efficiently coupled from the body 202 into the extractor 230 by placing the rear surface 232 against, or within less than one wavelength of, the extraction face 212. An index matching material, for example an index matching oil or an optical adhesive, may also be used between the extraction face 212 and the rear surface 232. The extractor 230 may be made of any suitable transparent material, for example a glass or a polymer.

The extractor 230 has a tapered cross-sectional area that increases towards its output end 234. The extractor walls 236 may be flat, as illustrated, or may be curved. The cross-sectional area (in the x-y plane) can increase in just one dimension, or in two. Reflection of fluorescent light 209 at the extractor walls 236 tends to direct the fluorescent light 209 along the z-direction, and so the angular spread of the fluorescent light at the output 234 of the extractor is less than the angular spread of the light as it enters the extractor 230 from the body. The reduced angular spread can reduce the amount of fluorescent light 209 that is totally internally reflected at the output surface 234. The output surface 234 may be flat, as illustrated, or may be curved.

Within the extractor 230 the fluorescent light may be totally internally reflected at the walls 236, or the walls 236 may be provided with a reflective coating, for example an inorganic dielectric stack or a polymer multi-layer optical film (MOF) reflective coating.

The extractor 230 may also be formed integrally with the body 202, for example the body 202 and the extractor 230 may be molded from a single piece of material, such as polymer material. Thus, the extractor 230 may contain at least one fluorescent material. The fluorescent material in the extractor 230 may be pumped by light from one or more emitters that direct pump light through the walls 236 of the extractor 230. On the other hand, the extractor 230 need not be pumped. Where the body 202 is formed integrally with the extractor 230, the extraction face 212 may be considered to be that area of the interface between the pumped region and the unpumped region of the material forming the integrated body/extractor.

Other extractor shapes, such as lenses, are also contemplated. See, for example, FIGS. 4A-4D of co-owned U.S. Patent Publication No. 2006/0227570, and the associated text.

Figure 3A:
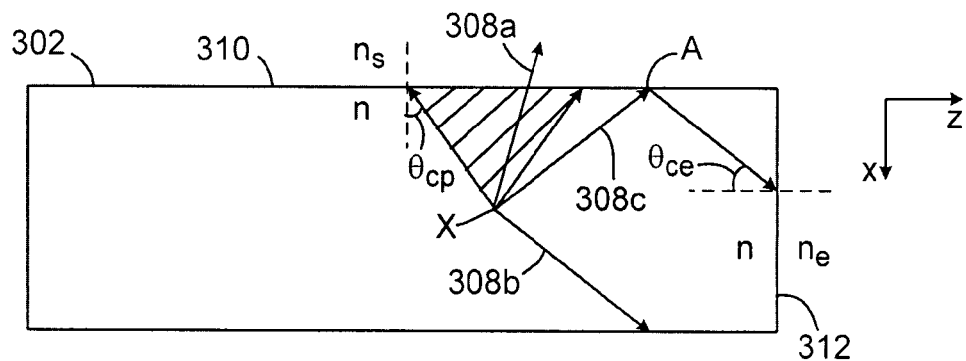
FIG. 3A schematically illustrates total internal reflection within a fluorescent body of a volume fluorescent light unit.

It is useful to consider the ranges of angles for which light generated within the fluorescent body is either reflected within the body or escapes from the body. Referring now to FIG. 3A, which schematically illustrates a fluorescent body 302 having a pump face 310 and a light extraction face 312, we consider light that is fluorescently generated at point X. If the light, for example ray 308a, is incident at the pump face 310 at an angle less than the critical angle, θcp, then the light 308a is transmitted through the pump face 310 and is lost.

The critical angle at the pump face 310, θcp, can be calculated from the expression:

$$\theta cp = \sin^{-1}(np/n), \qquad (5)$$

where np is the refractive index on the outside of the pump face and n is the refractive index of the body 302. The hatched region (in FIG. 3A) shows the range of angles that are less than θcp. If the pump face 310 is in air, the value of np is approximately equal to 1.

If the light propagating from point X, for example, light ray 308b, lies outside the cone indicated by the shaded region, then the light 308b is totally internally reflected by the pump face 310. Thus, in order to reduce the amount of light lost through the pump face, i.e. reduce θcp, in one embodiment, the value of n can generally be larger The critical angle at the extraction face 312, θce, is given by:

$$\theta ce = \sin^{-1}(ne/n), \quad (6)$$

where ne is the refractive index of the material outside the extraction face 312. This may be air or in some embodiments may be some other value, for example as it would be in the embodiment illustrated in FIG. 2. It can be desirable, in such a case, for θce to be large, so that a higher fraction of light propagates through the extraction face 312 without being totally internally reflected.

The ray 308c represents a light ray originating at fixed point X and propagating in the xz plane that, if reflected by the pump surface 310 at adjustable point A, is incident at the extraction face 312 at the critical angle, θce. Since the angle of incidence must equal the angle of reflection at point A, as the value of θce increases the reflected critical angle ray is incident at a position on the extraction face 312 that is farther in the +x direction, and the position of point A moves to the left, in the negative z direction. At some value of θce, the point A enters the hatched area, i.e. instead of being totally internally reflected by the pump face 310, the light ray is transmitted through the pump surface 310. Accordingly, the rate of increase in light output coupling efficiency as a function of ne is less when the value of θce becomes greater than that which puts point A at a point on the pump surface 310 where the angle of incidence from point X is less than θcp. Where the pump surface 310 and the extraction face 312 are at 90° to each other, this condition is met by the value of θce being no greater than 90°-θcp. This indicates that the extraction efficiency for fluorescent light from the body 302 may begin to level off as the refractive index of the output extractor approaches the value of refractive index of the body 302. Outcoupling may occur at higher values of θce for light that propagates non-parallel to the xz plane, but in general the increase in the outcoupling efficiency becomes smaller at the higher values of θce.

Figure 3B:
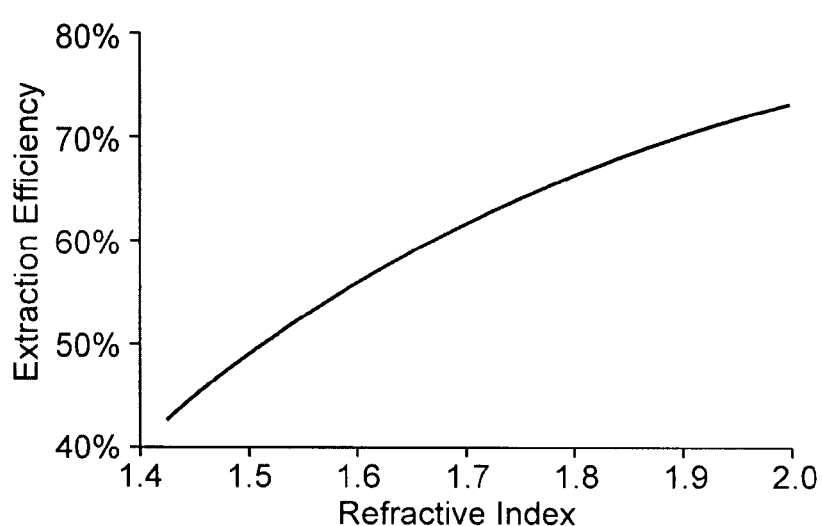
FIG. 3B presents a graph showing the calculated geometrical light collection efficiency as a function of the refractive index of the fluorescent body in a volume fluorescent light unit.

The maximum efficiency for coupling fluorescent light out of a body using total internal reflection may be calculated. As discussed above, some embodiments can have a body with a higher refractive index, so that a greater fraction of the fluorescent light is totally internally reflected within the body. FIG. 3B shows a graph of the maximum extraction efficiency, using an optimized output extractor, from a fluorescent body as a function of refractive index. At a refractive index value of n=1.5, the extraction efficiency is almost 50%, and at a value of n=1.9 is 70%.

Figure 4:
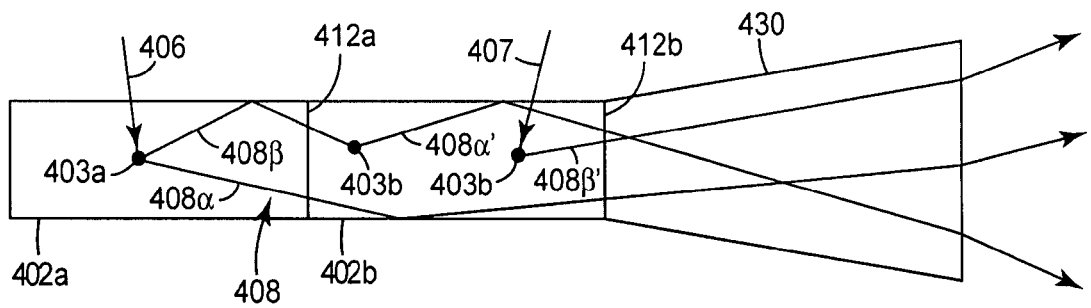
FIG. 4 schematically illustrates an embodiment of a series configuration of fluorescent bodies with a cascade interaction of at least two fluorescent materials.

In another embodiment, at least two fluorescent bodies, 402a and 402b, each containing respective different fluorescent materials 403a and 403b, may be placed in series, with or without direct physical contact between them. The extraction face 412a of the first fluorescent body 402a would then be adjacent an end surface of the second fluorescent body 402b. The two fluorescent bodies and their respective extraction faces may share a common optical axis (not shown). Thus, the extraction face 412b of the second fluorescent body 402b may be opposite its end surface that is nearest to the extraction face of the first fluorescent body, as illustrated in FIG. 4. (Other arrangements may be useful for specific applications.) In this configuration, some or all of the fluorescent light extracted from the first fluorescent body could excite the second fluorescent body. More than two fluorescent bodies could be arranged in series. This approach can be especially useful if the fluorescent light from the first fluorescent body has more than the desired wavelengths, so that the excess light could be used to excite the second fluorescent body. For example, in display applications, Ce:YAG has some unwanted yellow fluorescence, so a second fluorescent body that absorbed yellow and emitted red could be used to reclaim some of the yellow energy that would otherwise be wasted.

FIG. 4 shows an example of the series configuration with a cascade interaction and an optional second pump. Pump light 406 enters fluorescent body 402a and some is absorbed by fluorescent species 403a. Fluorescent species 403a emits fluorescent light 408. Some of the fluorescent light 408 is guided to the first extraction surface 412a, then on to extraction surface 412b at the end of the coupled fluorescent bodies, and is extracted (408α). Some of the fluorescent light, 408β, is guided into fluorescent body 402b and absorbed by the second fluorescent species, 403b. This second fluorescent species then emits fluorescent light 408α', some of which is guided to the end of the fluorescent body 402b and extracted through extraction surface 412b, possibly into optional extractor 430. Optionally, second pump light 407, which may have a different spectrum than pump light 406, can enter fluorescent body 402b and excite the second fluorescent species, 403b, directly. Then the fluorescent light 408β' is emitted and extracted from the end of the second fluorescent body, 402b, through its extraction surface 412b.

Figure 5:
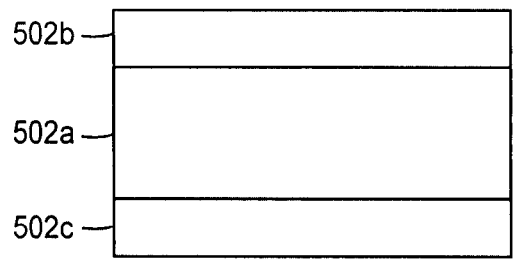
FIG. 5 schematically illustrates an embodiment of an end view of a parallel arrangement of three fluorescent bodies in direct contact.
Figure 6:
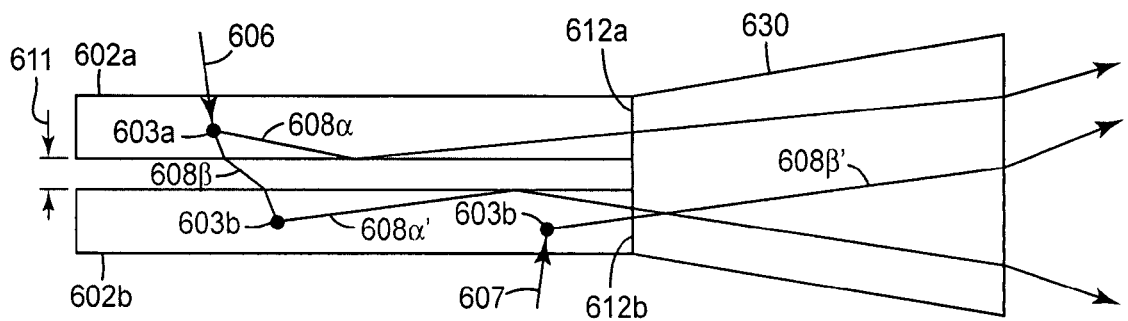
FIG. 6 schematically illustrates an embodiment of a parallel arrangement of two fluorescent bodies with a cascade interaction of two fluorescent materials.
Figure 7:
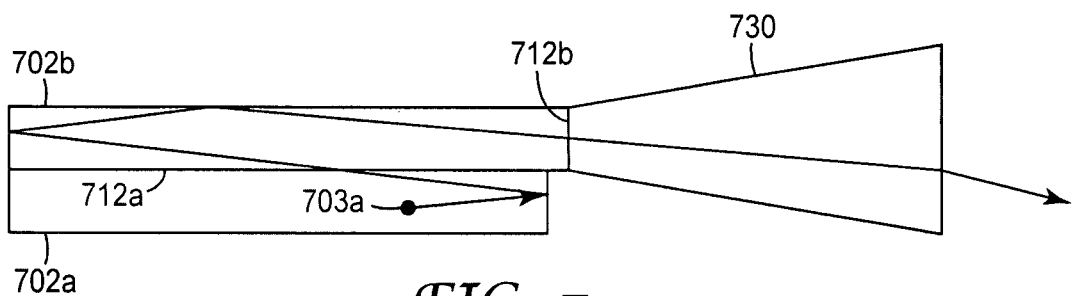
FIG. 7 schematically illustrates an embodiment of a parallel arrangement of two fluorescent bodies with combined output extraction from only one of the optical bodies.

In other embodiments, as illustrated, for example, in FIGS. 5, 6, and 7, multiple fluorescent bodies can be stacked side to side (in parallel), where the fluorescent bodies are optionally arranged in the same reflectorized pump cavity. If the fluorescent bodies are mounted with gaps between them, such as gap 611 in FIG. 6, then the fluorescent light from each fluorescent body will largely remain in that body, due to total internal reflection (TIR). Light that does not meet the TIR condition and thus would normally be lost, such as fluorescent light 608β from fluorescent species 603a of body 602a in FIG. 6, can be recovered by being absorbed in second fluorescent species 603b in the adjacent, spaced apart body 602b. This represents an increase in efficiency of the system. Furthermore, this spaced apart structure allows a large percentage of light 608α in wavelength range "a" to be directed to extractor 630 and used for illumination purposes. If fluorescent species 603b strongly absorbs light in wavelength range "a", co-doping 603a and 603b into the same body, as in FIG. 1A, would cause most of light 608α in wavelength range "a" to be absorbed and thus not be available in the output spectrum exiting extractor 630. Similarly, in FIG. 4, if fluorescent light 408β from fluorescent species 403a of body 402a is strongly absorbed by a species such as 403b in a following body 402b in a series of fluorescent bodies, much of the light 403a would not be available in the output spectrum exiting extractor 430. For example, in FIG. 6, if pump wavelengths 606 and 607 are both in the ultraviolet (UV), and species 603a absorbs UV and emits blue, and 603b strongly absorbs either UV or blue to emit green, then the output of extractor 630 could contain large amounts of both blue and green light. The same fluorescent species and pump wavelengths used in the configurations of FIG. 1 or 4 would have a much lower percentage of blue light in their output spectra.

Alternately, the side-by-side fluorescent bodies can be placed in optical contact, either with an interface material such as a gel or epoxy that may or may not be index matched, or with more intimate contact using techniques such as diffusion bonding, chemically assisted bonding, glass frit bonding or optical contacting. If the fluorescent bodies are in optical contact, then the fluorescent light from all the fluorescent bodies can mix together.

The same pump LEDs can excite all the fluorescent bodies, or different pump LEDs can be used for each fluorescent body. Also, efficiency can be increased if the fraction of the fluorescent light that escapes from one fluorescent body is absorbed in, and excites fluorescence in, another fluorescent body. In general, the shortest wavelength fluorescence would pump a fluorescent body with longer wavelength fluorescence. In this case, a favorable arrangement would place the shortest wavelength fluorescent body at the center. For instance, in FIG. 5, the fluorescent body 502a would be the body having the shortest wavelength fluorescence. Each of fluorescent bodies 502a, 502b, and 502c may contain a different fluorescent material.

The relative cross sections of the fluorescent bodies can be chosen to optimize the color balance (more efficient fluorescent bodies can be smaller). For example, in FIG. 5, the fluorescent body 502a is the least efficient fluorescent body so it is larger than the others.

If the light output from the fluorescent bodies is sufficiently bright, all the fluorescent bodies could be coupled to a single tapered extractor 630, as shown in FIG. 6. However, if brightness must be maintained, then the extractor can be connected to only one of the fluorescent bodies, as shown in FIG. 7. If both ends of fluorescent body 702a have a reflective coating, the light generated in fluorescent body 702a will eventually enter fluorescent body 702b through side extraction surface 712a and exit through the extractor 730 connected to fluorescent body 702b. In such an embodiment, the fluorescent body coupled directly to the extractor can have a refractive index approximately equal to or greater than those of all other fluorescent bodies adjacent to it.

FIG. 6 shows an example of two fluorescent bodies 602a and 602b in the parallel configuration, including cascade fluorescence and a second pump light 607. Pump light 606 is absorbed by fluorescent species 603a in fluorescent body 602a. Fluorescent species 603a emits fluorescent light 608. A portion of the fluorescent light, 608α, is guided to the end of the fluorescent body and extracted through extraction surface 612a. Another portion, 608β, escapes from the fluorescent body and enters fluorescent body 602b, where it is absorbed by the second fluorescent species 603b. Fluorescent species 603b emits fluorescent light 608α', which is guided to the end of the fluorescent body and extracted through extraction surface 612b. Optionally, pump light 607 (which can be at the same or a different wavelength than pump light 606) can enter fluorescent body 602b and can be absorbed by the second fluorescent species, 603b. Fluorescent species 603b would then emit fluorescent light 608β', some of which is guided to the end of the fluorescent body 602b and extracted through extraction surface 612b into optional tapered extractor 630.

Figure 8:
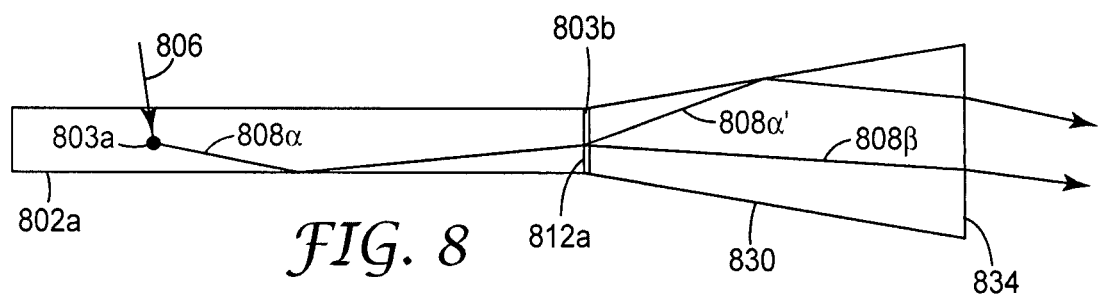
FIG. 8 schematically illustrates an embodiment of a fluorescent body having a phosphor material deposited on a portion of its surface.

In yet another embodiment, shown in FIG. 8, a single fluorescent body 802a containing a single fluorescent species 803a may be used. One end of body 802a, such as extraction surface 812a, may be coated with a phosphor (optionally encapsulated) containing a second (and possibly third, fourth, etc.) fluorescent species 803b. Pump light 806 is absorbed by fluorescent species 803a in fluorescent body 802a. Fluorescent species 803a emits fluorescent light 808α, which is guided to the extraction surface 812a at the end of the fluorescent body. Phosphor material 803b is located between the end of the fluorescent body 802a and the entrance to the extractor 830. Phosphor material 803b absorbs some or all of fluorescent light 808α and emits fluorescent light 808α', some of which is captured in the extractor 830 and emitted from the extractor endface 834. Optionally, some of the fluorescent light 808α may not be absorbed by phosphor material 803b, in which case it may be transmitted or scattered by the phosphor 803b into fluorescent light 808β. This approach provides an opportunity to improve the efficiency and spectral characteristics of the system without increasing the area of the extraction surface 812a (which would reduce brightness and degrade the source étendue), while not being limited by the requirement of having the fluorescent material located in a highly transparent, low scattering medium. Many phosphors with desirable absorption and emission spectra, such as Europium-doped strontium thiogallate ($SrGa_2S_4:Eu_{2+}$), are most readily available as highly-scattering powders.

Other configurations are possible, using various combinations of the embodiments provided. All of the above can be generalized to include a third, fourth, etc. fluorescent species.

Dichroic coatings can be used between fluorescent bodies in the series configuration, or on the end of the fluorescent body in the phosphor configuration. These coatings can help to increase absorption of light, to enhance extraction of fluorescent light, or to filter out undesirable wavelengths.

The output spectrum/color temperature can be adjusted for multiple fluorescent bodies in series by adjusting the current to pump LEDs at different locations. For multiple pump configurations, the output spectrum/color temperature can be adjusted by adjusting the relative amounts of pump light.

Figure 9:
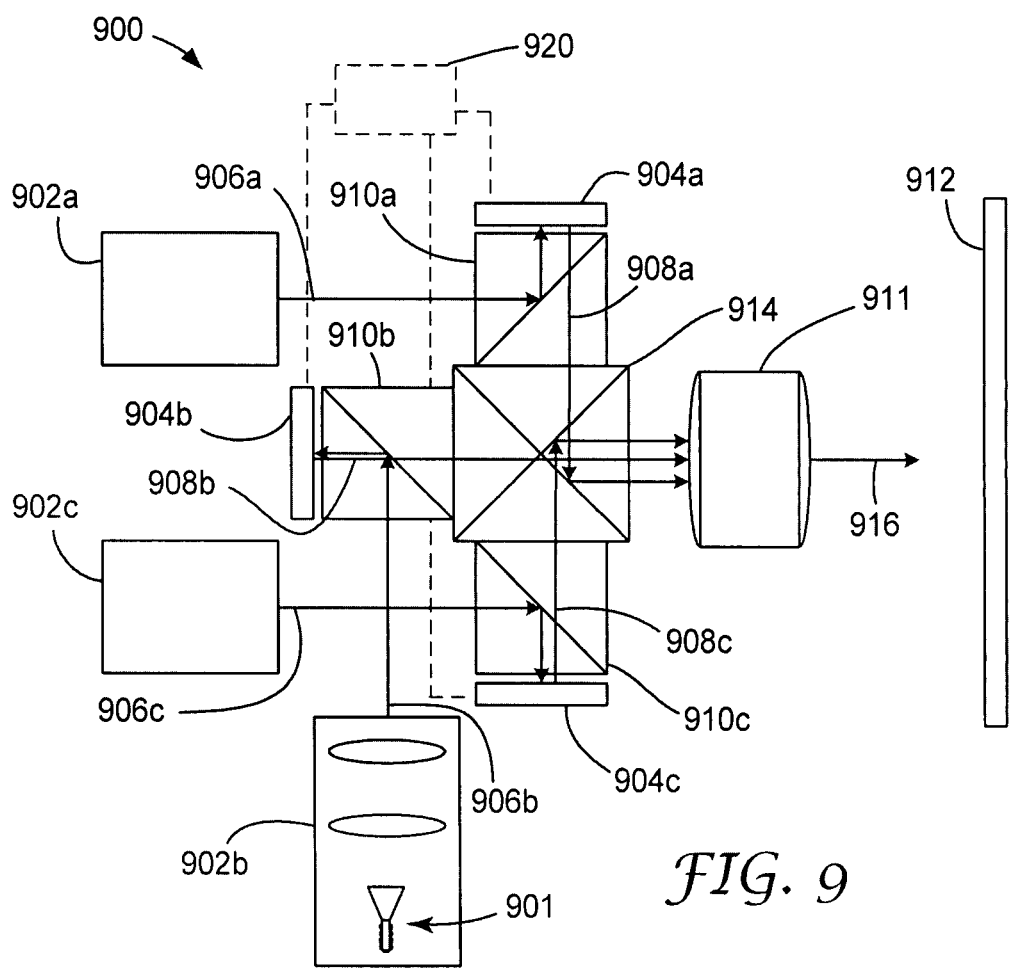
FIG. 9 schematically illustrates an embodiment of a projection system that uses a volume fluorescent light unit.

An exemplary embodiment of a projection system that might use a volume fluorescent light unit as described herein is schematically illustrated in FIG. 9. In this particular embodiment, the projection system 900 is a three-panel projection system, having light sources 902a, 902b, 902c that generate differently colored illumination light beams 906a, 906b, 906c, for example red, green and blue light beams. In the illustrated embodiment, the green light source 902b, includes a volume fluorescent light unit 901. However, any, or all of the light sources 902a, 902b, 902c may include volume fluorescent light units. The light sources 902a, 902b, 902c may also include beam steering elements, for example mirrors or prisms, to steer any of the colored illumination light beams 906a, 906b, 906c to their respective image-forming devices 904a, 904b, 904c.

The image-forming devices 904a, 904b, 904c may be any kind of image-forming device. For example, the image-forming devices 904a, 904b, 904c may be transmissive or reflective image-forming devices. Liquid crystal display (LCD) panels, both transmissive and reflective, may be used as image-forming devices. One example of a suitable type of transmissive LCD image-forming panel is a high temperature polysilicon (HTPS) LCD. An example of a suitable type of reflective LCD panel is the liquid crystal on silicon (LCOS) panel. The LCD panels modulate an illumination light beam by polarization modulating light associated with selected pixels, and then separating the modulated light from the unmodulated light using a polarizer. Another type of image-forming device, referred to as a digital multimirror device (DMD), and supplied by Texas Instruments, Plano, Tex., under the brand name DLP™, uses an array of individually addressable mirrors, which either deflect the illumination light towards the projection lens or away from the projection lens. In the illustrated embodiment, the image-forming devices 904a, 904b, 904c are of the LCoS type.

The light sources 902a, 902b, 902c may also include various elements such as polarizers, integrators, lenses, mirrors and the like for dressing the illumination light beams 906a, 906b, 906c.

The colored illumination light beams 906a, 906b, 906c are directed to their respective image forming devices 904a, 904b and 904c via respective polarizing beamsplitters (PBSs) 910a, 910b and 910c. The image-forming devices 904a, 904b and 904c polarization modulate the incident illumination light beams 906a, 906b and 906c so that the respective, reflected, colored image light beams 908a, 908b and 908c are separated by the PBSs 910a, 910b and 910c and pass to the color combiner unit 914. The colored image light beams 908a, 908b and 908c may be combined into a single, full color image beam 916 that is projected by a projection lens unit 911 to the screen 912.

The image-forming devices 904a, 904b, 904c may optionally be coupled to a controller 920 (dashed lines) that controls the image displayed on the screen 912. The controller may be, for example, the tuning and image control circuit of a television, a computer or the like.

In the illustrated exemplary embodiment, the colored illumination light beams 906a, 906b, 906c are reflected by the PBSs 910a, 910b and 910c to the image-forming devices 904a, 904b and 904c and the resulting image light beams 908a, 908b and 908c are transmitted through the PBSs 910a, 910b and 910c. In another approach, not illustrated, the illumination light may be transmitted through the PBSs to the image-forming devices, while the image light is reflected by the PBSs.

Other embodiments of projection systems may use a different number of image-forming devices, either a greater or smaller number. Some embodiments of projection systems use a single image-forming device while other embodiments employ two image-forming devices. For example, projection systems using a single image-forming device are discussed in more detail in co-owned U.S. Pat. No. 7,147,332 and projection systems using two image-forming devices are described in co-owned U.S. Patent Publication No. 2006/0028620, both of which are incorporated herein by reference. In a single panel projection system, the illumination light is incident on only a single image-forming panel. The incident light is modulated, so that light of only one color is incident on a part of the image-forming device at any one time. As time progresses, the color of the light incident on the image-forming device changes, for example, from red to green to blue and back to red, at which point the cycle repeats. This is often referred to as a "field sequential color" mode of operation. In other types of single panel projection systems, differently colored bands of light may be scrolled across the single panel, so that the panel is illuminated by the illumination system with more than one color at any one time, although any particular point on the panel is instantaneously illuminated with only a single color.

In a two-panel projection system, two colors are directed sequentially to a first image-forming device panel that sequentially displays an image for the two colors. The second panel is typically illuminated continuously by light of the third color. The image beams from the first and second panels are combined and projected. The viewer sees a full color image, due to integration in the eye.

Although the example above was shown in the context of a visible light projector system, any of the embodiments could equally well be applied in situations where at least one of the wavelength ranges is not within the visible spectrum. For example, the first source wavelength range could be ultraviolet light. As another example, the third wavelength range could be in the infrared. As yet another example, the first fluorescent material could transfer energy in the infrared range, either radiatively or non-radiatively, to a phosphorescent species in an excited state, causing visible emission from a higher excited state of the phosphorescent species.

The disclosure should not be considered limited to the particular examples described above, but rather should be understood to cover all aspects as fairly set out in the attached claims. Various modifications, equivalent processes, as well as numerous structures to which the present disclosure may be applicable will be readily apparent to those of skill in the art to which the disclosure is directed upon review of the present specification. The claims are intended to cover such modifications and devices.

We claim:

1. A projection system, comprising:
    an illumination system;
    a projection unit comprising at least one image-forming device;
    a projection lens unit; and
    a screen,
    the illumination system further comprising:
    at least a first source of incoherent light capable of generating light in a first wavelength range;
    a body containing a first fluorescent material that emits light in a second wavelength range, different from the first wavelength range, when illuminated by light in the first wavelength range; and
    at least a second fluorescent material receiving at least some of the light of at least one of the first and the second wavelength ranges, said second fluorescent material generating light of a third wavelength range,
    the body having an extraction area, at least some of the light of at least one of the second wavelength and the third wavelength being internally reflected within the body to the extraction area;
    wherein light in at least one of the second wavelength range and the third wavelength range illuminates the at least one image-forming device, image light from the at least one image forming device being projected by the projection lens unit to the screen.

2. A system as recited in claim 1, wherein the light in at least one of the second wavelength range and the third wavelength range is incoherent light.

3. A system as recited in claim 2, wherein light passing out of the light extraction area in at least one of the second and third wavelength ranges has a higher brightness than the brightness of the first wavelength range light entering the body from the at least a first source.

4. A system as recited in claim 1, wherein the second fluorescent material is within the body.

5. A system as recited in claim 1, further comprising a second source of incoherent light capable of generating light in a fourth wavelength range.

6. A system as recited in claim 1, wherein the concentration of the first fluorescent material is not uniform throughout the body.

7. A system as recited in claim 1, wherein the second fluorescent material comprises a phosphor layer adjacent at least one surface of the body.

8. A system as recited in claim 7, wherein the at least one surface of the body comprises the extraction area.

9. A system as recited in claim 8, further comprising an output extractor disposed adjacent to the phosphor layer, the output extractor being optically coupled to extract the light in the third wavelength range out of the phosphor layer.

10. A system as recited in claim 1, further comprising a second body adjacent the first body, the second body comprising the second fluorescent material.

11. A system as recited in claim 10 wherein the first body and second body are in physical contact.

12. A system as recited in claim 10, wherein the first body has at least one input surface different from its extraction surface, and the second body comprises an extraction surface adjacent to the at least one input surface of the first body.

13. A system as recited in claim 12, wherein a refractive index of the first body is approximately equal to or greater than a refractive index of the second body.

14. A system as recited in claim 1, wherein the second fluorescent material absorbs at least a portion of the light in the second wavelength range.

15. A system as recited in claim 1, wherein the body comprises a dichroic coating on a portion of its surface.

16. A system as recited in claim 1, wherein the at least a first source of incoherent light comprises a first source and at least a second source, the sources having one of the same or different source spectra, and further wherein the output spectrum of the light emitted through the extraction surface can be adjusted by adjusting the relative intensities of the first and second sources.

17. A system as recited in claim 16, wherein the portion of the output spectrum of the light transmitted through the extraction surface in the third wavelength range can be adjusted by adjusting the relative intensities of the first and second sources.

18. A system as recited in claim 1, wherein at least a portion of the energy absorbed by the first fluorescent material when illuminated by light in the first wavelength range is non-radioactively transferred to the second fluorescent material.

19. A system as recited in claim 1, wherein at least one of the first, second, and third wavelength ranges is at least partially outside the visible spectrum.

20. A system as recited in claim 1, further comprising a controller coupled to control an image formed by the at least one image-forming device.

* * * * *